P. PRYIBIL.
Band Sawing-Machine.
No. 169,035. Patented Oct. 19, 1875.
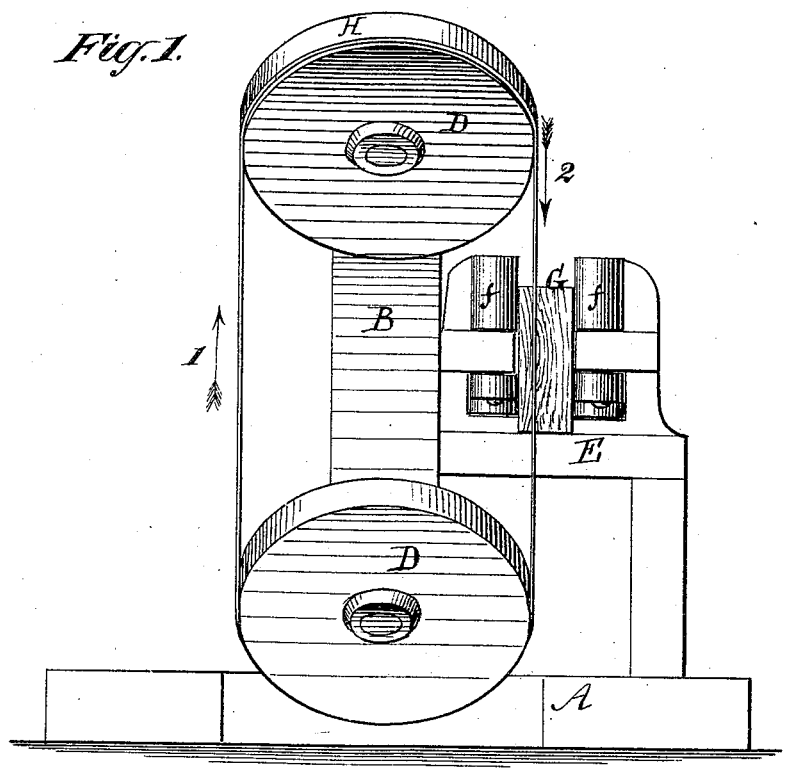
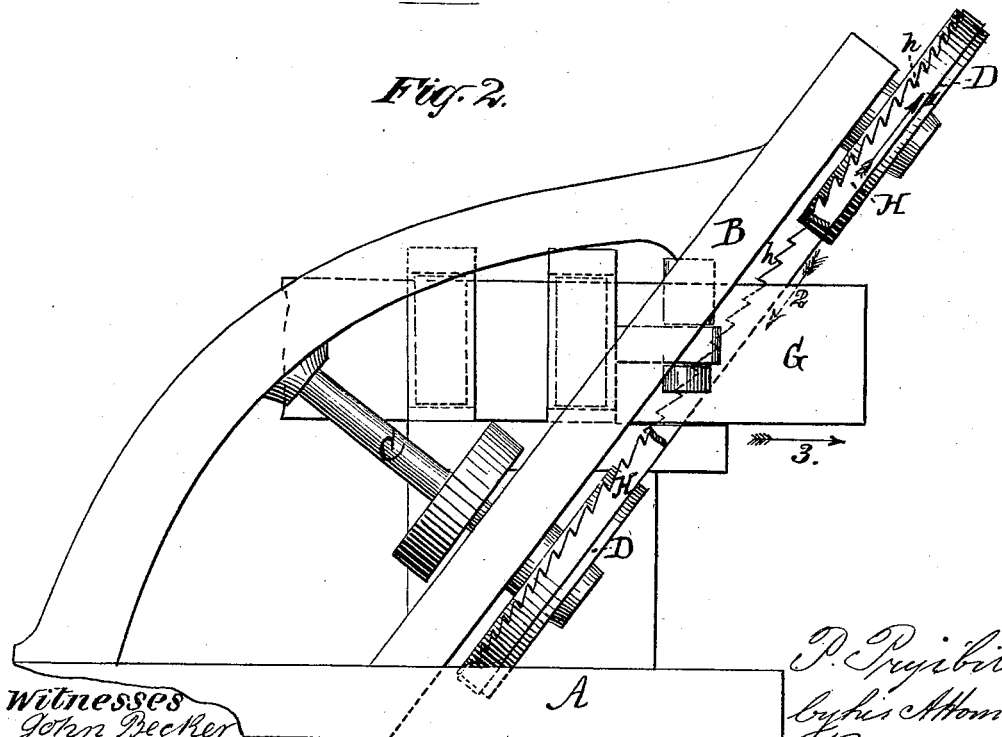

UNITED STATES PATENT OFFICE.

PAUL PRYIBIL, OF NEW YORK, N. Y.

IMPROVEMENT IN BAND SAWING-MACHINES.

Specification forming part of Letters Patent No. 169,035, dated October 19, 1875; application filed September 15, 1875.

*To all whom it may concern:*

Be it known that I, PAUL PRYIBIL, of New York, in the county and State of New York, have invented an Improvement in Band Sawing-Machines; and I do hereby declare that the following is a full, clear, and exact description of the same, reference being had to the accompanying drawing, making part of this specification.

My invention relates to an improvement in band-saws; and it consists in a novel arrangement of the saw with relation to the bed or work carriage of the saw-mill or sawing-machine, whereby the saw operates after the manner of a circular saw, and cuts against the grain, in consequence of which arrangement several advantages are obtained, as hereinafter particularly set forth.

In the accompanying drawing, Figure 1 is an end view of a machine arranged according to my invention, and Fig. 2 is a side view of the same.

The base A, which supports the working parts, may be of any suitable construction, and from it extends a standard or frame, B, in which is journaled the driving-shaft C, and in which are the bearings for the saw-pulleys D D, one of which may be carried by the driving-shaft, and the other have its bearing on a stud projecting from the frame.

The frame B, carrying the saw-pulleys, is inclined from a vertical line, or so arranged that the axes of the pulleys are inclined from a horizontal line at an angle of from thirty to sixty degrees with relation to the base or the work carriage or platform, for the purpose hereinafter described.

The work carriage or platform may be arranged in the usual or any suitable manner.

The platform or bed E is here shown as in a horizontal position, and provided with guide-rollers *f* for guiding the work G, and the band-saw H, passing around the inclined pulleys D D, is shown as running at an angle of about sixty degrees with relation to the surface of the work-platform, with its teeth *h* on the uppermost edge and the points downward.

The direction in which the saw travels is indicated by the arrows 1 2 in both figures, and the work G is fed to the saw in the direction indicated by the arrow 3.

By this arrangement of the saw with relation to the carriage or platform and to the direction of the work, and this arrangement of the teeth of the saw, the teeth point and are caused to move toward the work in an opposite direction to that in which the work moves, after the manner of the teeth of a circular saw, and the saw is made to cut against the grain instead of cutting with the grain, as would be the case if inclined in the reverse direction from a vertical line, or perpendicularly transverse to the grain as would be the case if running in a vertical line.

By cutting against the grain several advantages are obtained: the cutting-edge operating first upon the lower portion of the work, the face of each tooth strikes the ends of the fibers in such a manner as to break most of the wood off in small chips or slices instead of cutting it all into dust, and thus the saw performs a greater amount of cutting in a given time than could be performed if it were arranged to cut with the grain, or transversely thereto, as above described, in either of which cases it would be necessary for the saw to reduce the wood to sawdust as the operation progresses.

By arranging the saw according to my invention, less power is required for driving the saw and feeding the work, the saw will work longer after each filing, and more sawing can be done in a given time time than by the old arrangement.

The saw is equally applicable to both log sawing and resawing.

What I claim as new, and desire to secure by Letters Patent, is—

The combination, with the bed, platform, or carriage upon which the work to be sawed is placed, of a band-saw arranged obliquely to the surface of said bed, platform, or carriage, substantially as herein described.

PAUL PRYIBIL.

Witnesses:
 MICHAEL RYAN,
 FRED. HAYNES.